United States Patent [19]

Silva et al.

[11] Patent Number: 5,034,505

[45] Date of Patent: Jul. 23, 1991

[54] SINGLE-STEP METHOD FOR PREPARING POLYCARBONATES FROM BISCHLOROFORMATES

[75] Inventors: James M. Silva, Clifton Park; Thomas J. Fyvie, Schenectady, both of N.Y.

[73] Assignee: General Electric Company, Schenectady, N.Y.

[21] Appl. No.: 559,130

[22] Filed: Jul. 27, 1990

[51] Int. Cl.$^5$ .............................................. C08G 64/20
[52] U.S. Cl. ................................... 528/371; 528/198; 528/370
[58] Field of Search ............................... 528/371, 198

[56] References Cited

U.S. PATENT DOCUMENTS 4,743,676  5/1988  Silva et al. .......................... 528/371

Primary Examiner—Harold D. Anderson
Attorney, Agent, or Firm—William H. Pittman; James C. Davis, Jr.

[57] ABSTRACT

Aromatic bischloroformate compositions are interfacially converted to polycarbonates in a single step which includes capping with a monohydroxyaromatic compound. The reaction is conducted by adding an interfacial polycarbonate formation catalyst such as triethylamine and incrementally adding a base such as aqueous sodium hydroxide solution, without pH control, until the reaction mixture is non-emulsified. The amount of base to be added without pH control may be determined by titration. Further base is then added as necessary to provide a pH in the range of about 10-13.

20 Claims, No Drawings

SINGLE-STEP METHOD FOR PREPARING POLYCARBONATES FROM BISCHLOROFORMATES

This invention relates to the preparation of linear polycarbonates from bischloroformate compositions. More particularly, it relates to the preparation of linear polycarbonates of controlled molecular weight in a single step.

The preparation of bischloroformate compositions and their conversion to linear polycarbonates is known. Reference is made, for example, to U.S. Pat. Nos. 3,646,102, 4,089,888, 4,122,112 and 4,737,573.

In many procedures for the preparation of linear polycarbonates, both from bischloroformate compositions and by the reaction of phosgene with bisphenols, a monohydroxyaromatic compound is used as an endcapping agent for molecular weight control. Said monohydroxyaromatic compound, when incorporated in minor proportions in the reaction mixture, reacts with chloroformate-terminated polymers to form inert aromatic end groups, incapable of further polymerization.

Among the molecular species capable of reacting with phenols are chloroformate species of very low molecular weight. Phosgene itself may also react when it is used in the synthesis of the polycarbonate, yielding a diaryl carbonate such as diphenyl carbonate. Such low molecular weight products, when present in the polycarbonate product, may cause difficulties in molding operations. These include problems in removing molded polycarbonate articles from the mold, in producing parts using rapid cycle times, and in producing parts without physically or optically flawed surfaces. Problems of this type can be particularly vexatious when regularity of shape of such molded articles is a prime concern, such as in the manufacture of optical discs.

In U.S. Pat. No. 4,743,676, there is described an interfacial method (i.e., a method employing a mixed system comprising water and a substantially water-immiscible organic liquid) for preparation of linear polycarbonates from bischloroformate compositions which includes an initial step of reaction of the bischloroformate composition with a phenol or salt thereof in an alkaline medium to produce a partially capped bischloroformate composition. Said composition may then be converted in a subsequent step to a linear polycarbonate by contact, generally at a pH at least about 10, with an interfacial polycarbonate formation catalyst, typically a trialkylamine. This method avoids the formation of low molecular weight carbonates, including diaryl carbonates.

There is room for improvement of this process in at least two respects. In the first place, it is described as requiring two steps with introduction of the catalyst only in the second step, and is therefore often somewhat inconvenient. In the second place, polymerization of the partially capped composition often results in the formation of an emulsion between the aqueous and organic phases, resulting in inaccurate (low) pH readings and poor pH control by reason of inability to determine the proper amount of base to add to the mixture. As a result, polymer degradation may occur by reason of the presence of a large excess of base.

The present invention is based on the discovery that capping of the bischloroformate composition is faster than the bischloroformate hydrolysis-condensation reaction leading to polycarbonate, even when an interfacial polycarbonate formation catalyst is present in the reaction mixture. For the same reason, the presence of excess base in the reaction mixture early in the polymerization process is relatively non-detrimental; it is only in the later stages of the polymerization that excess base can cause degradation of the polycarbonate, and therefore it is in these later stages that the proportion of base added becomes more critical. Therefore, it is possible to add catalyst initially and conduct the capping and polymerization reactions in a single step, permitting simplification of the reaction scheme.

Accordingly, the invention is a method for preparing an aromatic polycarbonate which comprises:

effecting contact in a single step, under reaction-promoting conditions, between an aromatic bischloroformate composition and a chain-terminating amount of a monohydroxyaromatic compound or salt thereof, in a heterogeneous reaction medium comprising water and an inert, substantially water-insoluble organic liquid, by introducing into the mixture of said bischloroformate composition and monohydroxyaromatic compound an interfacial polycarbonate formation catalyst and an aqueous alkali metal base, said base being introduced without pH control and in an amount which is at least stoichiometrically sufficient to convert all of the bischloroformate to polycarbonate of the desired molecular weight and to finally form a non-emulsified heterogeneous system; and continuing base addition incrementally as necessary to bring the pH of the aqueous phase of the reaction mixture to a value within the range of about 10–13.

The aromatic bischloroformate compositions utilized in the method of this invention comprise compounds having the formula

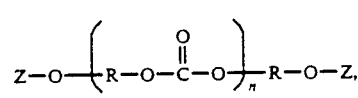

wherein R is a divalent aromatic radical; each Z is independently H or

at least one Z being

with the proviso that each Z is

in a major proportion of said compounds; and n is 0 or a positive number. They usually comprise principally bischloroformates (i.e., each Z is

)

having varying molecular weights. It is often desirable to maximize the proportion of bischloroformates in which is from 0 to about 6, at the expense of higher bischloroformates, monochloroformates, free dihydroxyaromatic compounds and other by-products. It is also necessary that the bischloroformate composition be essentially phosgene-free; if phosgene is present, it will react with endcapping agent to form diaryl carbonate, whose presence is disadvantageous as noted hereinabove.

These bischloroformate compositions may be prepared by known methods (e.g., the method disclosed in the aforementioned U.S. Pat. No. 4,737,573, incorporated by reference herein) by the reaction of phosgene with dihydroxyaromatic compounds having the formula HO—R—OH. The R values may be aromatic hydrocarbon or substituted aromatic hydrocarbon radicals, with illustrative substituents being alkyl, cycloalkyl, alkenyl (e.g., crosslinkable-graftable moieties such as allyl), halo (especially fluoro, chloro and/or bromo), nitro and alkoxy.

The preferred R values have the formula —$A^1$—Y—$A^2$—, wherein each of $A^1$ and $A^2$ is a monocyclic divalent aromatic radical and Y is a bridging radical in which one or two atoms separate $A^1$ from $A^2$. The free valence bonds are usually in the meta or para positions of $A^1$ and $A^2$ is relation to Y.

The $A^1$ and $A^2$ values may be unsubstituted phenylene or substituted derivatives thereof wherein the substituents are as defined for R. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group. Most preferably, each of $A^1$ and $A^2$ is p-phenylene and Y is isopropylidene.

According to the present invention, the bischloroformate composition is contacted under reaction-promoting conditions with a monohydroxyaromatic compound or a salt thereof. Capping in this manner is disclosed, for example, in U.S. Pat. No. 4,743,676, also incorporated by reference herein. It may be achieved by reaction with such compounds as phenol, p-t-butylphenol, p-cumylphenol, octylphenol and nonylphenol, with phenol frequently being preferred.

Contact is effected in a heterogeneous reaction medium comprising water and a substantially inert, substantially water-insoluble inorganic liquid. Illustrative organic liquids are aliphatic hydrocarbons such as hexane and n-heptane; chlorinated aliphatic hydrocarbons such as methylene chloride, chloroform, dichloroethane, trichloroethane, tetrachloroethane, dichloropropane and 1,2-dichloroethylene; aromatic hydrocarbons such as toluene and xylene; substituted aromatic hydrocarbons such as chlorobenzene, o-dichlorobenzene, the chlorotoluenes, nitrobenzene and acetophenone; and carbon disulfide. The chlorinated aliphatic hydrocarbons, especially methylene chloride, are preferred.

The proportion of monohydroxyaromatic compound (hereinafter sometimes simply designated "phenol" for brevity) employed is a chain-terminating amount which is dependent on the desired molecular weight of the polycarbonate finally formed, in accordance with the following equation:

$$P = \frac{200U}{M},$$

wherein P is the mole percent of endcapping agent based on structural units in the bischloroformate composition, U is the molecular weight of said structural units and M is the number average molecular weight of polycarbonate desired. This proportion is then adjusted according to the approximate value of the molecular weight distribution of the polycarbonate, the weight average molecular weight being the product of number average molecular weight and polydispersity. Phenol amounts of about 0.5–7.0 mole percent, based on structural units in the bischloroformate composition, are typical.

An interfacial polycarbonate formation catalyst is also introduced into the reaction mixture. Suitable catalysts are disclosed in the aforementioned U.S. Pat. Nos. 4,737,573 and 4,743,676, and include tertiary amines, quaternary ammonium and phosphonium salts and amidines of the type known in the art to be effective in the reaction of phosgene with bisphenols. Illustrative amines are triethylamine, tri-n-propylamine, diethyl-n-propylamine, tri-n-butylamine and 2-dimethylaminopyridine, with triethylamine being preferred. The proportion of catalyst is usually within the range of about 0.025–3.0 mole percent, based on structural units in the bischloroformate composition, with about 0.3–1.5 mole percent being preferred and about 0.3–0.7 being most preferred.

The method of this invention requires introduction of an aqueous alkali metal base such as sodium hydroxide, potassium hydroxide, sodium carbonate, potassium carbonate or sodium bicarbonate. Sodium hydroxide is generally preferred by reason of its low cost, availability and particular suitability.

In the first stage of the process, the base is introduced without pH control and in an amount at least stoichiometrically sufficient to convert all of the bischloroformate to polycarbonate of the desired molecular weight. This amount may be determined by simple experimentation, or may be based on experience. It is most often about 0.25–0.75 and preferably about 0.5–0.6 equivalent per mole of structural units in the bischloroformate composition.

Alternatively, one may perform at least one and preferably two titrations of the bischloroformate mixture to determine the amount of base to be added in this first stage of the method of the invention. The titration is performed by removing a sample of the heterogeneous bischloroformate composition, typically a 10-gram sample; adding an effective amount, typically about 10 mg., of interfacial polycarbonate formation catalyst such as triethylamine and, optionally, a stoichiometric amount of phenol to suppress formation of very high molecular weight polycarbonate; diluting to 50 grams with deionized water and adding dilute base (typically about 0.25 N) until a pH of about 10.5 is attained, the pH typically being determined by means of a pH electrode submerged in the reaction mixture.

During the titration, the usual hydrolysis-condensation reaction takes place between bischloroformate molecules, with the consumption of one equivalent of base and the evolution of 0.5 mole of carbon dioxide per equivalent of bischloroformate. Each mole of carbon dioxide then further reacts with two moles of base to form alkali metal carbonate.

Thus, the reaction exactly mimics polycarbonate formation except that it takes place in a much more dilute medium by reason of the addition of water. The additional water suppresses emulsion formation, whereby an accurate pH reading can be taken.

The amount of base determined by the aforementioned titration operation is an upper limit. A lower limit may be established by performing an identical titration, with the further addition of an excess of a phenol (e.g., p-cumylphenol), typically in the form of a 10% solution in methylene chloride, prior to beginning titration. Most often, about 1 gram of phenol is adequate. By reason of the excess of phenol, simple condensation thereof with chloroformate groups is highly favored over the hydrolysis-condensation reaction leading to polycarbonate. Under these conditions, each equivalent of chloroformate consumes one equivalent of base. There is then added to the bischloroformate reaction mixture an amount of base between the upper and lower limits thus determined.

Addition of base without pH control may be effected all at once, but incremental addition is usually preferred since it generally results in maximum utilization of phenol and bisphenol. Typical addition times are up to about 20 minutes, preferably up to about 10 minutes and most preferably about 3–6 minutes.

As previously mentioned, the invention is partially based upon the discovery that in this initial stage of the reaction, the simple condensation reaction which results in capping of the bischloroformate has a much higher rate than the hydrolysis-condensation which leads to polycarbonate. Thus, essentially complete capping takes place and polycarbonate formation is initiated without the necessity for pH control.

By the end of this stage of the process any emulsion which may have formed between the aqueous and organic phases has ordinarily been broken, making it possible to read the pH by means of a pH electrode or the like and continue base addition under conditions of controlled pH. Polycarbonate formation is completed during this second stage which is conducted at a pH in the range of about 10–13, preferably about 10–12.

A principal advantage of the method of this invention is that it avoids exposure of the polycarbonate to conditions of excessively high pH after completion of its formation; i.e., after base addition under pH control conditions is completed. It has been shown that exposure of the polymer to a pH above about 12 for periods greater than about 15 minutes can cause a substantial degree of degradation, as evidenced by an increase in concentration of free bisphenol and phenol.

The method of this invention is adaptable to both batch and continuous operation. In batch operation, the entire method may be conducted in a conventional agitated reaction vessel. For continuous operation, the reactor system must not be totally back-mixed but it need not be rigorously plug flow in character. For example, a series of two or more continuous-flow stirred-tank reactors may be employed and fed simultaneously with bischloroformate composition, additional water if necessary, phenol and catalyst. Aqueous base may be introduced with these feed materials; alternatively, if a plug flow reaction system such as a tube reactor is used, the base may be added at several injection points over the length thereof. It is then possible to take a pH reading near the exit point of the reactor system, beyond the point where the emulsion is broken, and employ feedback control to determine the amount of base to add upstream under controlled pH conditions.

Polycarbonate isolation following the practice of the method of this invention may be achieved by conventional means. These ordinarily involve such operations as precipitation with a non-solvent, filtration and washing.

The method of this invention is illustrated by the following examples. Percentages are by weight unless otherwise indicated. Mole percentages of catalyst and base are based on structural units in the bischloroformate composition. Molecular weights are weight average and were determined by gel permeation chromatography.

EXAMPLES 1–7

A 1-liter reactor was fitted with a pump-around loop for pH measurement, a dip tube for base addition, a condenser cooled at 4° C., a dual 6-blade flat blade turbine impeller and a thermocouple. The reactor was charged with 830 ml. of a bisphenol A bischloroformate oligomer composition containing 620 mmol. of bisphenol A carbonate units, 350 ml. of deionized water and 0.5 mg. of benzophenone as an internal standard, and the pH was adjusted to 3–4 by addition of 3 N aqueous hydrochloric acid solution. Agitation was commenced at 450 rpm. and the recirculation pump for the pump-around loop was started.

After the mixture had circulated for 2–3 minutes, there was added 2.63 grams (4.5 mole percent) of phenol and a measured amount of triethylamine. There was then added 18 ml. of 50% aqueous sodium hydroxide solution (344 mmol.), all at once or over various time periods. After completion of this stage, the mixture had become non-emulsified and additional aqueous sodium hydroxide was added to bring the pH to 11–12. A sample of the reaction mixture was removed after the expiration of 15 minutes (all times being measured from the beginning of base addition) and was analyzed by high pressure liquid chromatography and gel permeation chromatography. Upon the expiration of 30 minutes, additional base was added to raise the pH to a value in the range of 12–12.5 and stirring was continued for an additional 30 minutes (total 60 minutes). A further sample was then removed and analyzed. The results are given in the following table, in comparison with a control in which a separate capping step preceded polycarbonate formation in accordance with U.S. Pat. No. 4,743,676.

|  | Example | | | | | | | Control[1] |
|---|---|---|---|---|---|---|---|---|
|  | 1 | 2 | 3 | 4 | 5 | 6 | 7 |  |
| Triethylamine, mole % | 0.5 | 0.5 | 0.5 | 1.0 | 1.0 | 1.0 | 1.0 | 1.0 |
| Base addition time, min. | 0 | 5.5 | 9.5 | 0 | 5.5 | 9.5 | 12.5 | 5[2] |

-continued

| | Example | | | | | | | Control[1] |
|---|---|---|---|---|---|---|---|---|
| | 1 | 2 | 3 | 4 | 5 | 6 | 7 | |
| Phenol, ppm.: | | | | | | | | |
| 15 min. | 42 | 0 | 0 | 54 | 0 | 21 | 37 | 205 |
| 60 min. | 36 | 0 | 9 | 44 | 0 | 13 | 27 | — |
| Bisphenol A, ppm.: | | | | | | | | |
| 15 min. | 0 | 0 | 8 | 7 | 0 | 14 | 7 | 23 |
| 60 min. | 0 | 7 | 39 | 5 | 76 | 105 | 233 | — |
| Mol. wt.[2] | 23,700 | 23,300 | 22,600 | 24,700 | 22,700 | 22,000 | 20,600 | 22,650 |

[1]Average of 2 runs.
[2]Triethylamine and base both added incrementally.

It is apparent from the table that the highest polycarbonate molecular weight values are obtained according to the invention when the time of base addition is within the preferred range of up to about 10 minutes. Polycarbonates of optimum stability, as shown by minimum values of free phenol and bisphenol A in the product, are obtained in the most preferred base addition time of about 3-6 minutes. At the preferred lower level of catalyst concentration (0.5 mole percent), less polycarbonate degradation takes place than at the higher concentration (1 mole percent). In all examples, the proportion of free phenol and bisphenol A was lower than in the controls. Finally, the effect of prolonged exposure to base at a pH in excess of the preferred range frequently leads to increased degradation as shown by free bisphenol A concentration, with this phenomenon being particularly pronounced at the higher catalyst concentration.

What is claimed is:

1. A method for preparing an aromatic polycarbonate which comprises:
    effecting contact in a single step, under reaction-promoting conditions, between an aromatic bischloroformate composition and a chain-terminating amount of a monohydroxyaromatic compound or salt thereof, in a heterogeneous reaction medium comprising water and an inert, substantially water-insoluble organic liquid, by introducing into the mixture of said bischloroformate composition and monohydroxyaromatic compound an interfacial polycarbonate formation catalyst and an aqueous alkali metal base, said base being introduced without pH control and in an amount which is at least stoichiometrically sufficient to convert all of the bischloroformate to polycarbonate of the desired molecular weight and to finally form a non-emulsified heterogeneous system; and
    continuing base addition incrementally as necessary to bring the pH of the aqueous phase of the reaction mixture to a value within the range of about 10-13.

2. A method according to claim 1 wherein the aromatic bischloroformate composition comprises compounds having the formula

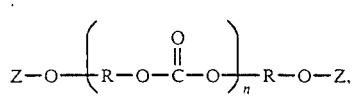   (I)

wherein R is a divalent aromatic radical; each Z is independently H or

at least one Z being

with the proviso that each Z is

in a major proportion of said compounds; and n is 0 or a positive number.

3. A method according to claim 2 wherein each R has the formula $-A^1-Y-A^2-$, wherein each of $A^1$ and $A^2$ is a monocyclic divalent aromatic radical and Y is a bridging radical in which one or two atoms separate $A^1$ from $A^2$.

4. A method according to claim 3 wherein the organic liquid is a chlorinated aliphatic hydrocarbon.

5. A method according to claim 4 wherein the monohydroxyaromatic compound is phenol, p-t-butylphenol, p-cumylphenol, octylphenol or nonylphenol.

6. A method according to claim 5 wherein the amount of base added without pH control is about 0.25-0.75 equivalent per mole of structural units in the bischloroformate composition.

7. A method according to claim 5 wherein the amount of monohydroxyaromatic compound is about 0.5-7.0 mole percent based on structural units in the bischloroformate compositions.

8. A method according to claim 5 wherein the amount of base to be added without pH control is determined by titration.

9. A method according to claim 5 wherein the proportion of catalyst is about 0.025-3.0 mole percent based on structural units in the bischloroformate composition.

10. A method according to claim 5 wherein the base is sodium hydroxide.

11. A method according to claim 10 wherein the chlorinated aliphatic hydrocarbon is methylene chloride.

12. A method according to claim 11 wherein the proportion of catalyst is about 0.3-1.5 mole percent based on structural units in the bischloroformate composition.

13. A method according to claim 12 wherein the sodium hydroxide added without pH control is added incrementally.

14. A method according to claim 13 wherein the final pH of the reaction mixture is in the range of about 11-13.

15. A method according to claim 14 wherein $A^1$ and $A^2$ are each p-phenylene and Y is isopropylidene.

16. A method according to claim 15 wherein the interfacial polycarbonate formation catalyst is triethylamine.

17. A method according to claim 13 wherein the amount of base added without pH control is about 0.5-0.6 equivalent per mole of structural units in the bischloroformate composition.

18. A method according to claim 17 wherein the final pH of the reaction mixture is in the range of about 11-12.

19. A method according to claim 18 wherein the proportion of triethylamine is about 0.3-0.7 mole percent based on structural units in the bischloroformate composition.

20. A method according to claim 18 wherein the monohydroxyaromatic compound is phenol p-t-butylphenol or p-cumynphenol.

* * * * *